(12) United States Patent
Bryant (10) Patent No.: US 10,843,870 B1
(45) Date of Patent: Nov. 24, 2020

(54) SYSTEM FOR ORDER DISPENSATION VIA AN ANGLED PICKUP PORTAL

(71) Applicant: Walmart Apollo, LLC, Bentonville, AR (US)

(72) Inventor: Boyd D. Bryant, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/877,556

(22) Filed: May 19, 2020

Related U.S. Application Data (60) Provisional application No. 62/849,953, filed on May 19, 2019.

(51) Int. Cl.
| | |
|---|---|
| *B65G 1/137* | (2006.01) |
| *A47F 3/02* | (2006.01) |
| *A47F 9/04* | (2006.01) |
| *G06Q 30/06* | (2012.01) |
| *G06K 7/14* | (2006.01) |

(52) U.S. Cl.
CPC ............. *B65G 1/1371* (2013.01); *A47F 3/02* (2013.01); *A47F 9/042* (2013.01); *A47F 9/047* (2013.01); *G06K 7/1417* (2013.01); *G06Q 30/0635* (2013.01); *B65G 2203/042* (2013.01)

(58) Field of Classification Search
CPC .. B65G 1/1371; B65G 2203/042; A47K 3/02; A47K 9/047; A47K 9/042; G06Q 30/0635; G06K 7/1417
USPC .................................................. 700/231–244
See application file for complete search history.

(56) References Cited

U.S. PATENT DOCUMENTS

| | | | |
|---|---|---|---|
| 4,317,604 A * | 3/1982 | Krakauer | ................ G07F 11/54 312/125 |
| 4,363,392 A | 12/1982 | McDonald | |
| 4,571,898 A | 2/1986 | Le Cacheux et al. | |
| 4,677,278 A | 6/1987 | Knoll | |
| 5,205,436 A * | 4/1993 | Savage | ..................... A47F 3/02 221/1 |
| 5,244,266 A * | 9/1993 | Maldanis | ................ G07F 11/54 312/116 |
| 5,692,342 A | 12/1997 | Devlin, Jr. | |
| 5,730,316 A * | 3/1998 | Falk | ..................... G07F 11/007 221/12 |
| 6,048,043 A | 4/2000 | Kaspar | |
| 7,925,375 B2 * | 4/2011 | Schininger | ............ G07F 11/007 700/214 |

(Continued)

FOREIGN PATENT DOCUMENTS

WO        2014158083 A1    10/2014

*Primary Examiner* — Michael Collins (57) ABSTRACT

Examples an order pickup portal including a set of sliding doors enclosing an order dispensation portal configured to dispense a set of items to fulfill an online order created by a user. An angled side wall is adjacent to one of the doors. The angle of the side wall is between a twenty-five and sixty-degrees relative to the doors. A user interface device is partially recessed into the angled side wall associated with the first side wall, the user interface device comprising a graphical user interface menu configured to receive order data associated with a user request for dispensation of a set of items associated with the online order. A scan device can be included to scan an order identifier. A plastic bag return receptacle is provided to contain returned bags.

19 Claims, 6 Drawing Sheets

(56) References Cited

U.S. PATENT DOCUMENTS

| | | | |
|---|---|---|---|
| 8,145,351 B2* | 3/2012 | Schininger | G07F 17/12 |
| | | | 700/237 |
| 8,509,944 B1* | 8/2013 | Kranyec | G07F 17/12 |
| | | | 700/214 |
| 9,098,959 B2* | 8/2015 | Baric | G07F 9/10 |
| 9,352,679 B2 | 5/2016 | Tollefson et al. | |
| D767,297 S | 9/2016 | Madsen et al. | |
| 9,536,236 B2* | 1/2017 | Hay | G06Q 20/204 |
| 9,747,630 B2* | 8/2017 | Mierle | G06Q 30/0637 |
| 9,934,483 B1* | 4/2018 | Sangani | G06Q 10/0837 |
| 2004/0030428 A1 | 2/2004 | Crampton et al. | |
| 2005/0192705 A1* | 9/2005 | Pinney | G07F 9/002 |
| | | | 700/241 |
| 2006/0293784 A1* | 12/2006 | Braunstein | G06Q 20/18 |
| | | | 700/231 |
| 2012/0130534 A1* | 5/2012 | Wurm | G07F 9/026 |
| | | | 700/236 |
| 2015/0120514 A1 | 4/2015 | Deshpande et al. | |
| 2016/0078523 A1 | 3/2016 | Lopez et al. | |
| 2017/0330142 A1* | 11/2017 | Kanellos | G06K 7/1417 |
| 2017/0372394 A1 | 12/2017 | Jones et al. | |
| 2018/0005184 A1 | 1/2018 | Schenken | |
| 2019/0172032 A1* | 6/2019 | Wang | G05B 19/042 |
| 2019/0333302 A1* | 10/2019 | Kagnew | G07C 9/00896 |

* cited by examiner

SYSTEM FOR ORDER DISPENSATION VIA AN ANGLED PICKUP PORTAL

BACKGROUND

Currently, when a customer makes an online order of items via a website or application, the customer typically waits for the items to be delivered by mail or travels to a brick-and-mortar store location to pickup the items. If the items are mailed, the customer may sometimes have to wait for days or even weeks for delivery. If the customer goes to a store to pickup the items, the customer typically has to go inside the store and wait for the items to be brought out. In some solutions, the customer can go through a drive-through pickup area or park in a pickup area and wait for the items to be brought out to the customers car. However, these solutions can be time-consuming, inefficient and inconvenient for customers. Moreover, as the number of online orders increases, the logistics of manual delivery of items to each customer can become burdensome and cost-prohibitive.

SUMMARY

Some examples provide a system for dispensing items via an angled order dispensation portal. The system includes an order dispensation portal configured to dispense a set of totes via an order pickup alcove. The order dispensation portal is enclosed by a set of automatic sliding doors. The automatic sliding doors slide open to permit a user to access the set of totes. An adjacent side wall associated with the order dispensation portal is offset at a first angle relative to the order dispensation portal. A user interface device is attached to the side wall and recessed at a second angle relative to the exterior surface of the adjacent side wall. The user interface device receives user input associated with order data associated with requested dispensation of at least one item associated with an online grocery order. A scan device is associated with the side wall.

Other examples provide a computer-implemented method for dispensing items to a user via an order dispensation portal. Order identification data associated with an online items order is received from a user interface device recessed into a first side wall adjacent to a first side of an order dispensation portal. A set of totes containing a set of items corresponding to items requested in the online items order is dispensed via an order pickup alcove enclosed by a set of automatic sliding doors associated with the order dispensation portal, wherein the automatic sliding doors slide open to permit a user to access the set of totes. The user is instructed to return any unwanted bags via a bag return receptacle associated with at least one side wall adjacent to the order dispensation portal.

Still other examples provide an order pickup portal including a set of sliding doors enclosing an order dispensation portal configured to dispense a set of totes storing one or more items associated with an online order created by a user. A first side wall adjacent to a first door in the set of automatic sliding doors. The first side wall is angled forty-five-degree relative to the first door. A second side wall adjacent to a second door in the set of automatic sliding doors. A user interface device associated with the first side wall. A graphical user interface menu associated with the user interface device configured to receive order data associated with a user request for dispensation of a set of items associated with the online order.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . ." For brevity and clarity of presentation, this implied leading clause is not repeated ad nauseum.

Figure 1:
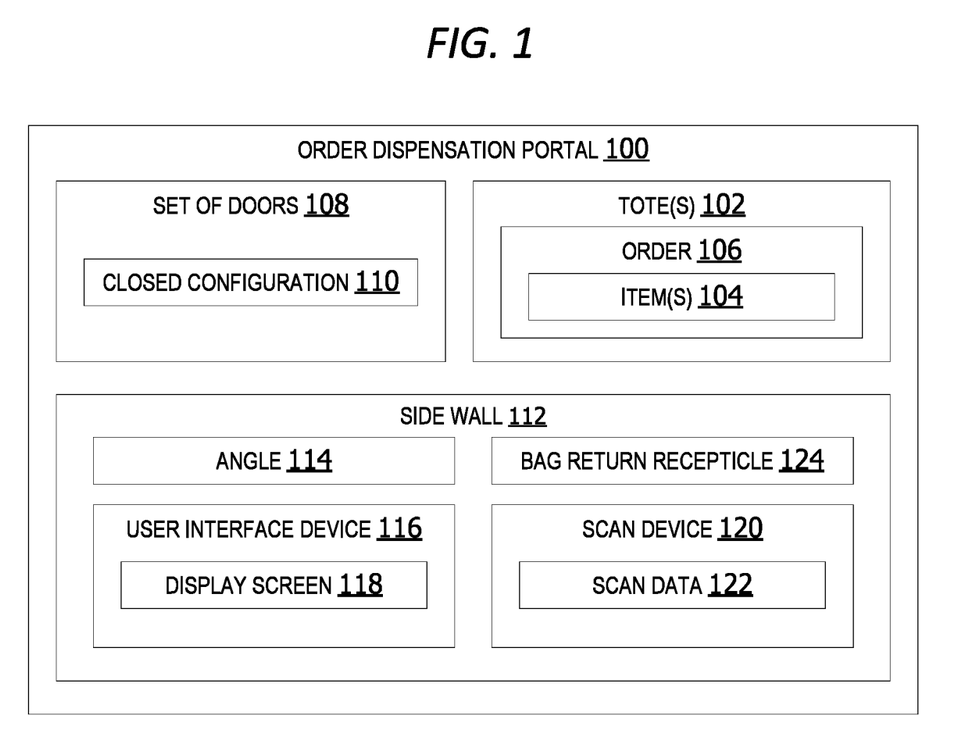
FIG. 1 is an exemplary block diagram illustrating an angled order dispensation portal.

FIG. 1 is an exemplary block diagram illustrating an angled order dispensation portal 100. The order dispensation portal 100 is an automated device for dispensing ordered items to a user via a set of one or more tote(s). The tote(s) 102 include one or more item(s) 104 associated with an order 106 created by the user via a website, application or other online order creation. The tote(s) containing the item(s) 104 for pickup are dispensed within an alcove behind a set of doors 108. When the set of doors are in a closed configuration 110, the user cannot access the totes. When the doors are in an open configuration, the user can access the tote(s) 102 to remove the ordered item(s) 104.

The order dispensation portal includes a set of side walls. At least one side wall is set at an angle 114 to the set of doors 108. In this example, the side wall 112 is positioned at a forty-five degree (45° angle) relative to the set of doors 108. The angled side wall includes a user interface device 116 mounted to the side wall. The user interface device 116 includes a display screen 118 to output notifications and other order data to the user. The display screen 118 in this example is a touch screen.

The side wall 112 can also include a scan device 120. The scan device scans an order identifier (ID), such as a barcode or quick response (QR) code to identify the item(s) requested in the order 106. The system analyzes the scan data 122 generated by scanning to automatically determine which item(s) 104 to dispense to the user.

A bag return receptacle 124 is included in some non-limiting examples. The bag return receptacle 124 provides a container for storing/returning unwanted plastic bags. The bag return receptacle 124 can be mounted on the side wall 112 in some examples. In other examples, the bag return receptacle 124 is mounted within the order pickup alcove behind the set of doors 108 (not shown).

In still other examples, the order dispensation portal does not include an attached/mounted bag return receptacle. In these examples, the user interface device outputs instructions to the user to either retain bags or return bags to a detached bag recycle/bag return receptacle which is not physically mounted to the order dispensation portal 100.

Figure 2:
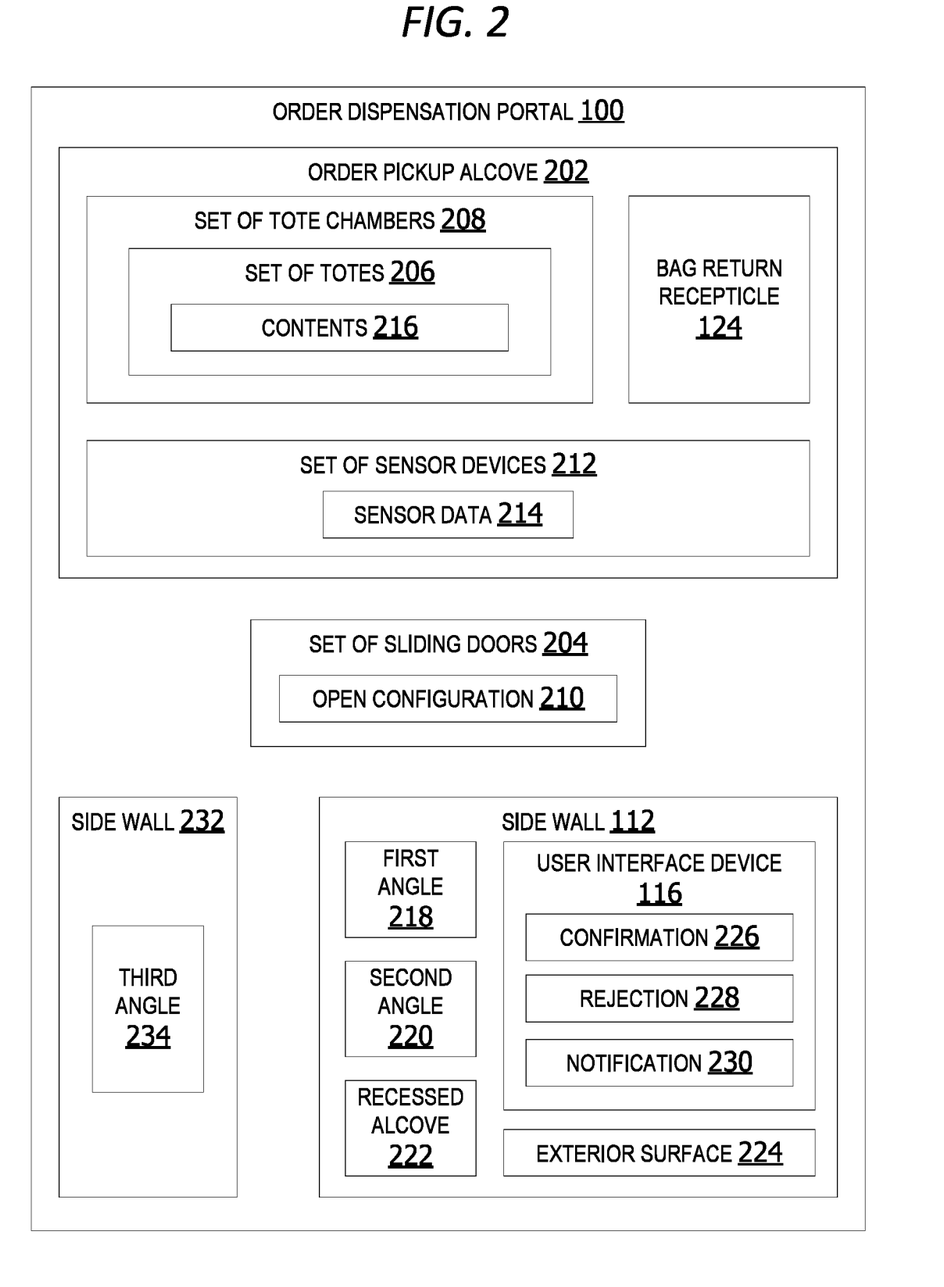
FIG. 2 is an exemplary block diagram illustrating an order dispensation portal including at least one angled side wall.

FIG. 2 is an exemplary block diagram illustrating an order dispensation portal 100 including at least one angled side wall, such as the side wall 112. The order dispensation portal 100 includes an order pickup alcove 202 behind a set of sliding doors 204. The order pickup alcove 202 in some examples includes a set of totes 206 within a set of tote chambers 208 for storing a set of items to be dispensed to a user, such as, but not limited to, the tote(s) 102 in FIG. 1.

When the set of sliding doors 204 are in an open configuration 210, the user can enter the order pickup alcove 202 to retrieve the contents 216 of the set of totes 206. The contents 216 include the item(s) ordered by the user.

The order pickup alcove 202 can optionally include a set of sensor devices 212 generating sensor data 214. The set of sensor devices can optionally include one or more image capture devices, one or more pressure sensors, one or more optical sensors, as well as any other type of sensor device. An image capture device can include a camera, an infrared sensor, or any other type of image capture device.

A bag return receptacle 124 in some examples is mounted or otherwise attached to a wall within the order pickup alcove. In other examples, the bag return receptacle 124 can be mounted to an exterior side wall, such as the side wall 112.

The side wall 112 is adjacent to the set of sliding doors at a first angle 218 to the set of sliding doors 204. The first angle 218 is an angle within a range from twenty to sixty degrees. In other examples, the first angle 218 is a forty-five-degree angle.

A user interface device 116 is mounted within a recessed alcove 222 of an exterior surface 224 of the side wall 112. The user interface device 116 in this non-limiting example is set within the side wall at a second angle 220 relative to the exterior surface of the side wall 112. The second angle is an angle within a range from twenty to sixty degrees. In this example, the angle is a twenty-degree angle.

The user interface device 116 receives user input, such as confirmation 226 that a user accepts a dispensed item and/or rejection 228 of an item dispensed via the order dispensation portal 100. The user interface device can also output a notification 230 updating the user as to the portion of an order being dispensed, when all items have been dispensed, etc.

The order dispensation portal 100 in some examples includes a second side wall 232 situated at a third angle 234 relative to the set of sliding doors 204. The third angle 234 is an angle within a range from twenty to sixty degrees. In some examples, the third angle 234 is a forty-five-degree angle. In other examples, the angle is an angle less than forty-five degrees but no less than twenty degrees.

Figure 3:
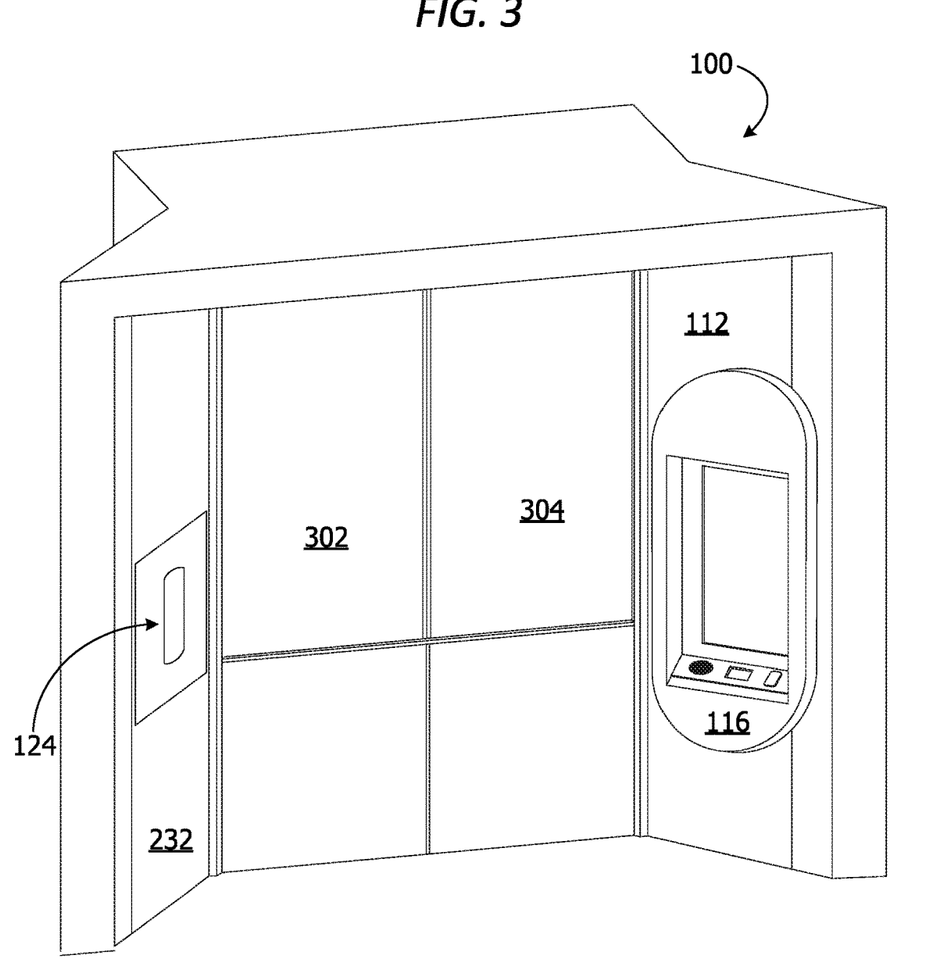
FIG. 3 is an exemplary block diagram illustrating angled side walls on an order dispensation portal.

FIG. 3 is an exemplary block diagram illustrating angled side walls on an order dispensation portal 100. The order dispensation portal 100 includes an angled side wall 112 situated at a forty-five-degree angle relative to the set of sliding doors. In this example, the set of sliding doors includes door 302 and door 304. A user interface 116 is attached to the angled side wall 112. A bag return receptacle 124 is optionally mounted to the second side wall 232. When door 302 and 304 open, a user has access to the interior portion of the order pickup alcove.

Figure 4:
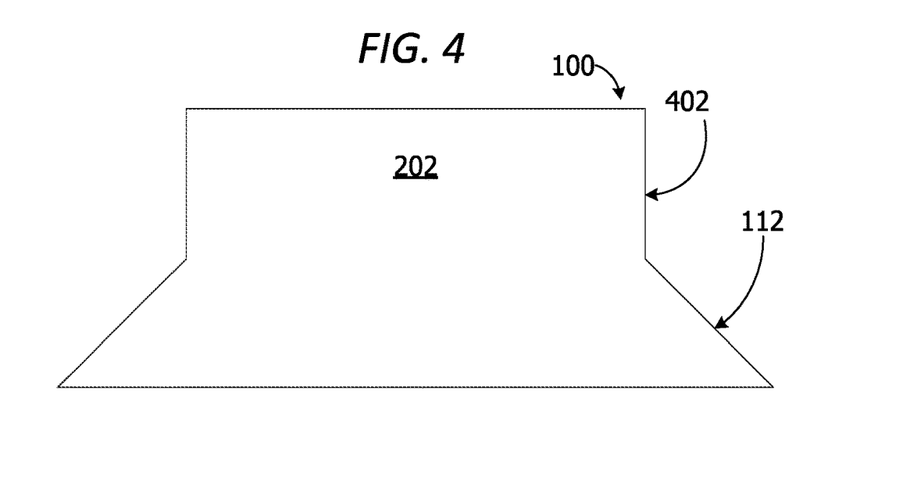
FIG. 4 is an exemplary block diagram illustrating a footprint of an order dispensation portal having angled side walls.

FIG. 4 is an exemplary block diagram illustrating a footprint of an order dispensation portal 100 having angled side walls. In this example, the angled side wall 112 is angled forty-five degrees relative to an interior wall 402 of the order pickup alcove 202.

Figure 5:
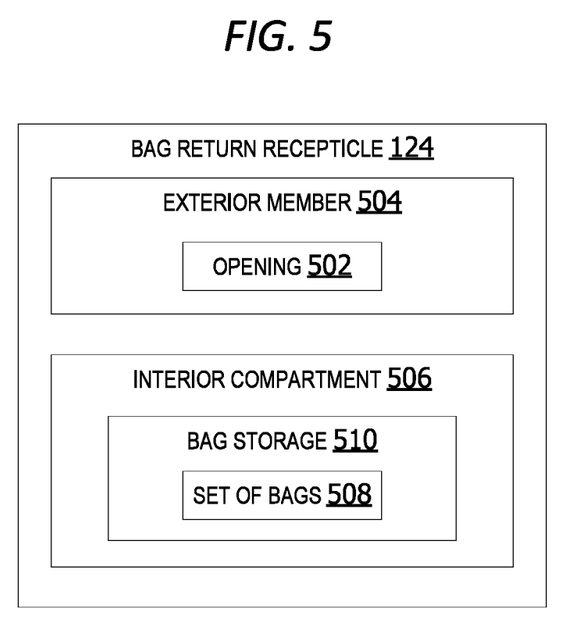
FIG. 5 is an exemplary block diagram illustrating a bag return receptacle.

FIG. 5 is an exemplary block diagram illustrating a bag return receptacle 124. The bag return receptacle 124 includes an exterior member 504 defining an opening 502. The opening 502 provides a point of entry into an interior compartment 506 for storing a set of bags 508, such as, but not limited to, one or more plastic bags within a bag storage 510 area. The bag return receptacle 124 can be mounted onto the angled side wall or mounted within the order pickup alcove.

Figure 6:
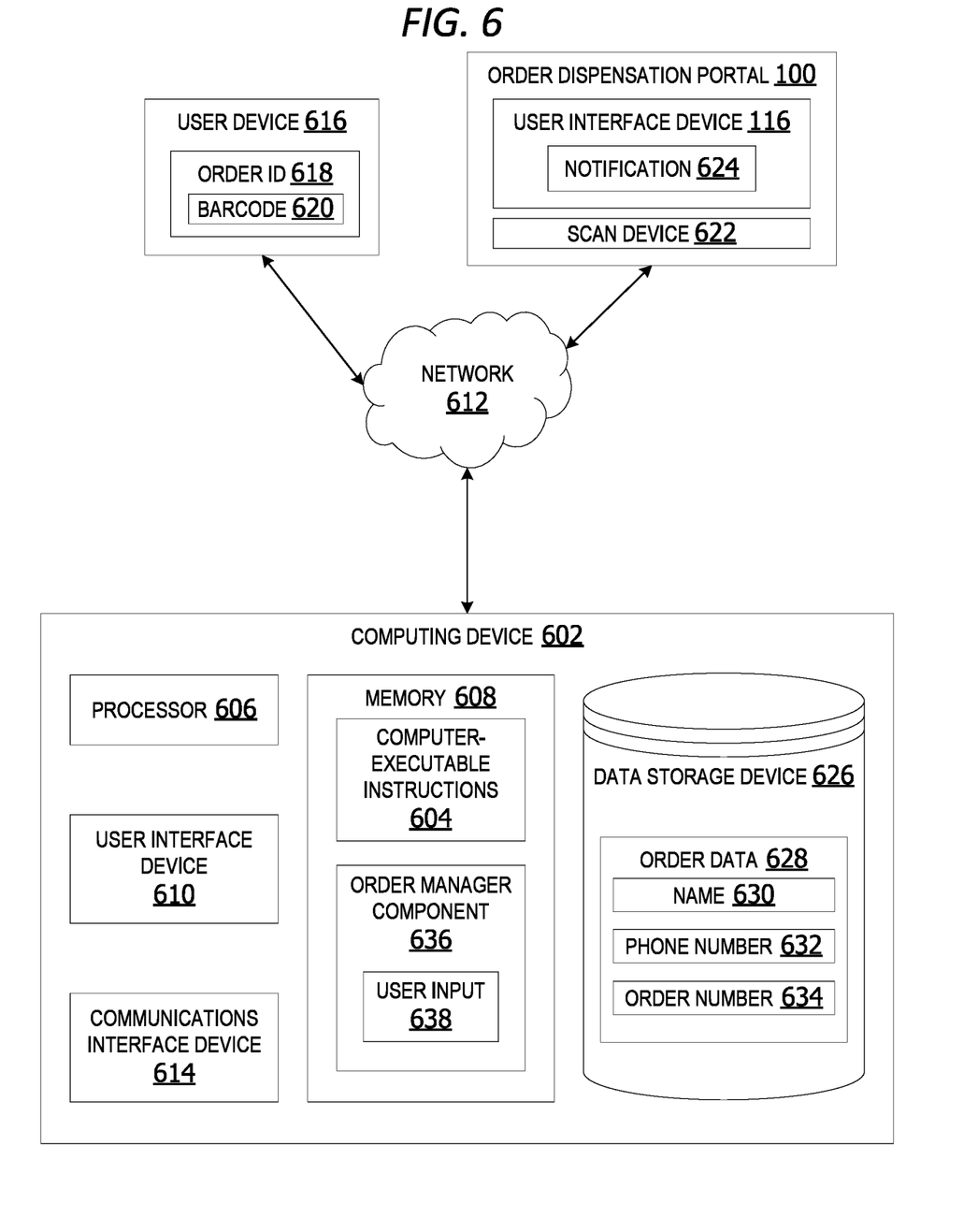
FIG. 6 is an exemplary block diagram illustrating a system for dispensing order items to a user via an order dispensation portal.

FIG. 6 is an exemplary block diagram illustrating a system 600 for dispensing order items to a user via an order dispensation portal. In the example of FIG. 6, the computing device 602 represents any device executing computer-executable instructions 604 (e.g., as application programs, operating system functionality, or both) to implement the operations and functionality associated with the computing device 602. The computing device 602 in some examples includes a mobile computing device or any other portable device. A mobile computing device includes, for example but without limitation, a mobile telephone, laptop, tablet, computing pad, netbook, gaming device, and/or portable media player. The computing device 602 can also include less-portable devices such as servers, desktop personal computers, kiosks, or tabletop devices. Additionally, the computing device 602 can represent a group of processing units or other computing devices.

In some examples, the computing device 602 has at least one processor 606 and a memory 608. The computing device 602 in other examples includes a user interface device 610.

The processor 606 includes any quantity of processing units and is programmed to execute the computer-executable instructions 604. The computer-executable instructions 604 is performed by the processor 606, performed by multiple processors within the computing device 602 or performed by a processor external to the computing device 602. In some examples, the processor 606 is programmed to execute instructions such as those illustrated in the figures (e.g., FIG. 7).

The computing device 602 further has one or more computer-readable media such as the memory 608. The memory 608 includes any quantity of media associated with or accessible by the computing device 602. The memory 608 in these examples is internal to the computing device 602 (as shown in FIG. 6). In other examples, the memory 608 is external to the computing device (not shown) or both (not shown). The memory 608 can include read-only memory and/or memory wired into an analog computing device.

The memory 608 stores data, such as one or more applications. The applications, when executed by the processor 606, operate to perform functionality on the computing device 602. The applications can communicate with counterpart applications or services such as web services accessible via a network 612. In an example, the applications represent downloaded client-side applications that correspond to server-side services executing in a cloud.

In other examples, the user interface device 610 includes a graphics card for displaying data to the user and receiving data from the user. The user interface device 610 can also include computer-executable instructions (e.g., a driver) for operating the graphics card. Further, the user interface device 610 can include a display (e.g., a touch screen display or natural user interface) and/or computer-executable instructions (e.g., a driver) for operating the display. The user interface device 610 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 602 in one or more ways.

The network 612 is implemented by one or more physical network components, such as, but without limitation, routers, switches, network interface cards (NICs), and other network devices. The network 612 is any type of network for enabling communications with remote computing devices, such as, but not limited to, a local area network (LAN), a subnet, a wide area network (WAN), a wireless (Wi-Fi) network, or any other type of network. In this example, the network 612 is a WAN, such as the Internet. However, in other examples, the network 612 is a local or private LAN.

In some examples, the system 600 optionally includes a communications interface component 614. The communications interface component 614 includes a network interface card and/or computer-executable instructions (e.g., a driver) for operating the network interface card. Communication between the computing device 602 and other devices, such as but not limited to a user interface device 116 and/or a user interface device 116 associated with the order dispensation portal 100, can occur using any protocol or mechanism over any wired or wireless connection. In some examples, the communications interface component 614 is operable with short range communication technologies such as by using near-field communication (NFC) tags.

The user device 616 represents any device executing computer-executable instructions. The user device 616 can be implemented as a mobile computing device, such as, but not limited to, a wearable computing device, a mobile telephone, laptop, tablet, computing pad, netbook, gaming device, and/or any other portable device. The user device 616 includes at least one processor and a memory. The user device 616 can also include a user interface device.

A user can utilize a scan device 622 on the order dispensation portal 100 to scan an order ID 618, such as a barcode 620, displayed on the user device 616. The system 600 utilizes the scan data generated by the scan device to identify the user's ordered items and dispense those ordered items to the user automatically.

The system 600 can optionally include a data storage device 626 for storing data, such as, but not limited to order data 628. The order data 628 can include the customer's name, phone number, order number, items ordered, pick-up date, pick-up time, or other order data.

The data storage device 626 can include one or more different types of data storage devices, such as, for example, one or more rotating disks drives, one or more solid state drives (SSDs), and/or any other type of data storage device. The data storage device 626 in some non-limiting examples includes a redundant array of independent disks (RAID) array. In other examples, the data storage device 626 includes a database.

The data storage device 626 in this example is included within the computing device 602 or associated with the computing device 602. In other examples, the data storage device 626 includes a remote data storage accessed by the computing device via the network 612, such as a remote data storage device, a data storage in a remote data center, or a cloud storage.

The memory 608 in some examples stores one or more computer-executable components. Exemplary components include an order manager component 636. The order manager component 636 analyzes user input 638 provided by a user to identify items to be dispensed to the user.

In some examples, the order manager component enables the user to request an order by providing a user name or phone number, scanning a barcode or quick response code or entering an order number via the user interface device. The order manager component outputs notification 624 via the user interface device 116 and/or the user device 616.

Figure 7:
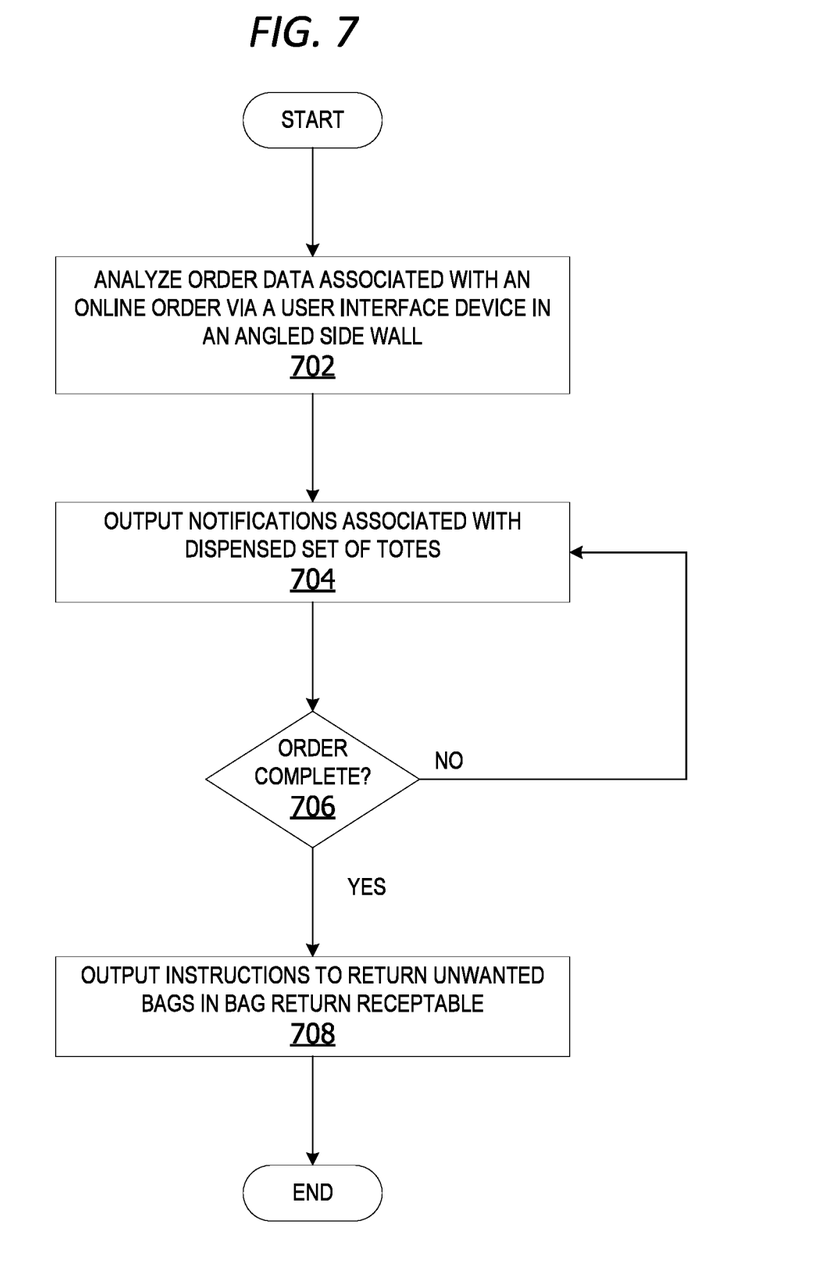
FIG. 7 is an exemplary flow chart illustrating operation of the computing device to dispense items to a user via an angled order dispensation portal.

FIG. 7 is an exemplary flow chart illustrating operation of the computing device to dispense items to a user via an angled order dispensation portal. The process shown in FIG. 7 is performed by an order manager component, executing on a computing device, such as the computing device 602 or the user device 616 in FIG. 6.

The process begins by analyzing order data associated with an online order via a user interface device on an angled side wall at 702. The order manager component outputs notification(s) associated with dispensed set of totes containing ordered items to the user at 704. The notifications are displayed on the user interface, such as the user interface device 116 in FIG. 1. The order manager component determines if the order is complete at 706. If yes, the order manager component outputs instructions to the user to return unwanted bags in a bag return receptacle at 708. The bag return receptacle is a device, such as, but not limited to, the bag return receptacle 124 in FIG. 1. The process terminates thereafter.

While the operations illustrated in FIG. 7 are performed by a computing device, aspects of the disclosure contemplate performance of the operations by other entities. In a non-limiting example, a cloud service performs one or more of the operations.

ADDITIONAL EXAMPLES

In some examples, the side wall with the customer interface portal is angled 45° to the building wall instead of the original ninety-degrees (90°). At ninety-degrees, the use of the interface can feel cramped to the user. At a forty-five-degree angle, the user's shoulders are not pressed up against the building wall. By angling the wall, the shoulder is given more space without increasing the overall footprint of the order dispensation portal. The forty-five-degree angled side walls provide users a more comfortable experience.

Alternatively, or in addition to the other examples described herein, examples include any combination of the following:

a plastic bag return receptacle associated with the first side wall, the plastic bag return receptacle comprising an exterior member defining an opening associated with an interior compartment for storing plastic bags;

a plastic bag return receptacle associated with an interior wall of the order dispensation portal, wherein a user can access the plastic bag return receptacle when the automatic sliding doors are in an open configuration;

the first angle and the second angle is an angle within a range from twenty to sixty degrees;

the first angle or the second angle is a forty-five-degree angle;

a set of sensor devices associated with the order dispensation portal;

the set of sensor devices generates sensor data associated with one or more items within the order dispensation portal;

an order request component output via the user interface device;

the order request component enables the user to request an order by providing a user name or phone number, scanning a barcode or quick response code or entering an order number via the user interface device;

the user interface device outputs order dispensation notifications to the user as each portion of an order is dispensed to the user via the order dispensation portal;

receiving order identification data associated with an online items order from a user via a user interface device recessed into a first side wall adjacent to a first side of an order dispensation portal;

dispensing a set of totes containing a set of items corresponding to items requested in the online items order via an order pickup alcove enclosed by a set of automatic sliding doors associated with the order dispensation portal, wherein the automatic sliding doors slide open to permit a user to access the set of totes;

directing, via the user interface, the user to return any unwanted bags via a bag return receptacle associated with a second side wall adjacent to a second side of the order dispensation portal;

scanning a QR code via a scan device mounted on the first side wall or the second side wall to identify the online items order;

scanning a barcode via a scan device mounted on the first side wall or the second side wall to identify the online items order;

the first side wall and the second side wall are angled forty-five-degrees relative to the automatic sliding doors associated with the order dispensation portal;

receiving confirmation of acceptance of the items from the user via the user interface device;

receiving confirmation of rejection of one or more of the items by the user via the user interface device;

a set of automatic sliding doors enclosing an order dispensation portal configured to dispense a set of totes storing one or more items associated with an online order created by a user;

a first side wall adjacent to a first door in the set of automatic sliding doors, wherein the first side wall is angled forty-five-degree relative to the first door;

a second side wall adjacent to a second door in the set of automatic sliding doors, wherein the second side wall is angled forty-five-degree relative to the second door;

a user interface device associated with the first side wall, the user interface device comprising a graphical user interface menu configured to receive order data associated with a user request for dispensation of a set of items associated with the online order;

a scan device associated with the first side wall configured to scan an order identifier associated with the at least one online grocery order;

a plastic bag return receptacle associated with the first side wall, the plastic bag return receptacle comprising an exterior member defining an opening associated with an interior compartment for storing plastic bags; and a plastic bag return receptacle associated with an interior wall of the order dispensation portal, wherein a user can access the plastic bag return receptacle when the automatic sliding doors are in an open configuration.

At least a portion of the functionality of the various elements in FIG. 1, FIG. 2, FIG. 3, FIG. 4, FIG. 5, and FIG. 6 can be performed by other elements in FIG. 1, FIG. 2, FIG. 3, FIG. 4, FIG. 5, and FIG. 6, or an entity (e.g., processor 606, web service, server, application program, computing device, etc.) not shown in FIG. 1, FIG. 2, FIG. 3, FIG. 4, FIG. 5, and FIG. 6.

In some examples, the operations illustrated in FIG. 7 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of automatically dispensing items to a user.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent can take the form of opt-in consent or opt-out consent.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for dispensing items to a user automatically via an order dispensation portal. For example, the elements illustrated in FIG. 1, FIG. 2, FIG. 3, FIG. 4, FIG. 5, and FIG. 6, such as when encoded to perform the operations illustrated in FIG. 7, constitute exemplary means for analyzing order ID data, exemplary means for identifying status of order dispensing and exemplary means for outputting notifications to the user.

Other non-limiting examples provide one or more computer storage devices having a first computer-executable instructions stored thereon for providing order item dispensing. When executed by a computer, the computer performs operations including receiving order identification data associated with an online items order from a user via a user interface device recessed into a first side wall adjacent to a first side of an order dispensation portal; dispensing a set of totes containing a set of items corresponding to items requested in the online items order via an order pickup alcove enclosed by a set of automatic sliding doors associated with the order dispensation portal, wherein the automatic sliding doors slide open to permit a user to access the set of partial order totes; and directing, via the user interface, the user to return any unwanted bags via a bag return receptacle associated with a second side wall adjacent to a second side of the order dispensation portal.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

In an exemplary embodiment, one or more of the exemplary embodiments include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system can be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data can include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI can be discarded depending upon the degree to which such KRI has any value based on local processing and evaluation of such KRI. In an exemplary embodiment, KRI may not even be utilized in any form if it is determined that KRI is transient and can be considered as signal noise. Furthermore, in an exemplary embodiment, the kernel rejects generic data to provide a modified kernel ("KRG") by filtering incoming raw data using a stochastic filter that thereby provides a predictive model of one or more future states of the system and can thereby filter out data that is not consistent with the modeled future states which can, for example, reflect generic background data. In an exemplary embodiment, KRG incrementally sequences all future undefined cached kernels of data to filter out data that can reflect generic background data. In an exemplary embodiment, KRG further incrementally sequences all future undefined cached kernels having encoded asynchronous data to filter out data that can reflect generic background data.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for dispensing items via an order dispensation portal, the system comprising:
   an order dispensation portal configured to dispense a set of totes via an order pickup alcove enclosed by a set of sliding doors, wherein automatic sliding doors slide open to permit user access to contents of the set of totes;
   a side wall adjacent to the set of sliding doors offset at a first angle relative to the set of sliding doors;
   a user interface device associated with the side wall, the user interface device recessed at a second angle relative to an exterior surface of the side wall, the user interface device configured to receive order data associated with requested dispensation of at least one item associated with an online grocery order; and
   a scan device associated with the side wall configured to scan an order identifier associated with the online grocery order.

2. The system of claim 1, further comprising:
   a bag return receptacle associated with a first side wall, the bag return receptacle comprising an exterior member defining an opening associated with an interior compartment for storing a set of bags.

3. The system of claim 1, further comprising:
   a bag return receptacle associated with an interior wall of the order dispensation portal, wherein a user can access the bag return receptacle when the set of sliding doors are in an open configuration.

4. The system of claim 1, wherein the first angle and the second angle is an angle within a range from twenty to sixty degrees.

5. The system of claim 1, wherein the first angle is a forty-five-degree angle.

6. The system of claim 1, wherein the second angle is a forty-five-degree angle.

7. The system of claim 1, further comprising:
   a set of sensor devices associated with the order dispensation portal, wherein the set of sensor devices generates sensor data associated with one or more items within the order dispensation portal.

8. The system of claim 1, further comprising:
   an order manager component output via the user interface device, wherein the order manager component enables the user to request an order by providing a user name or phone number, scanning a barcode or entering an order number via the user interface device.

9. The system of claim 1, wherein the user interface device outputs a notification to the user as each portion of an order is dispensed to the user via the order dispensation portal.

10. A computer-implemented method for dispensing items to a user via an order dispensation portal, the computer-implemented method comprising:
    receiving order data associated with an online order via a user interface device recessed into a first side wall adjacent to a first side of an order dispensation portal, wherein the user interface device includes a scan device configured to scan an order identifier associated with the online order;
    dispensing a set of totes containing a set of items corresponding to items requested in the online order via an order pickup alcove enclosed by a set of automatic sliding doors associated with the order dispensation portal, wherein the set of automatic sliding doors slide open to permit access to the set of totes; and
    generating instructing, via the user interface device, to return any unwanted bags via a bag return receptacle associated with the order dispensation portal.

11. The computer-implemented method of claim 10, wherein the first side wall and a second side wall are angled forty-five-degrees relative to the set of automatic sliding doors associated with the order dispensation portal.

12. The computer-implemented method of claim 11, wherein the order identifier is
    a barcode.

13. The computer-implemented method of claim 11, wherein the order identifier is
    a QR code.

14. The computer-implemented method of claim 10, further comprising:
    receiving confirmation of acceptance of the items via the user interface device.

15. The computer-implemented method of claim 10, further comprising:
    receiving confirmation of rejection of one or more of the items via the user interface device.

16. An order pickup portal comprising:
    a set of sliding doors enclosing an order dispensation portal configured to dispense a set of totes storing one or more items associated with an order created by a user;
    a first side wall adjacent to a first door in the set of sliding doors, wherein the first side wall is angled forty-five-degree relative to the first door;
    a second side wall adjacent to a second door in the set of sliding doors, wherein the second side wall is angled relative to the second door;
    a user interface device associated with the first side wall, the user interface device comprising a graphical user interface menu configured to receive order data associated with a user request for dispensation of a set of items associated with the order; and
    a scan device associated with the first side wall configured to scan an order identifier associated with at least one online grocery order.

17. The order pickup portal of claim 16, further comprising:
    a plastic bag return receptacle associated with the first side wall, the plastic bag return receptacle comprising an exterior member defining an opening associated with an interior compartment for storing plastic bags.

18. The order pickup portal of claim 16, further comprising:
    a plastic bag return receptacle associated with an interior wall of the order dispensation portal, wherein a user can access the plastic bag return receptacle when the set of sliding doors are in an open configuration.

19. The order pickup portal of claim 16, further comprising:
    a set of sensor devices associated with the order dispensation portal, wherein the set of sensor devices generates sensor data associated with one or more items within the order dispensation portal.

\* \* \* \* \*